March 31, 1942.                H. P. PHILLIPS                    2,278,019
                            PISTON RING ASSEMBLY
                            Filed March 8, 1940
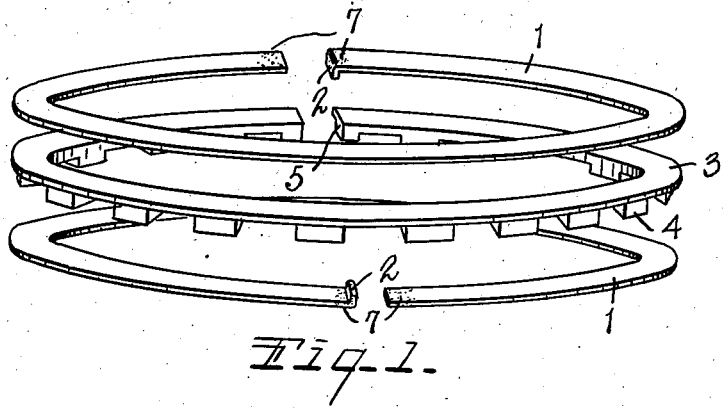
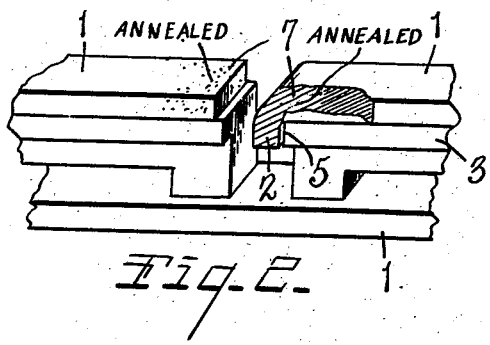 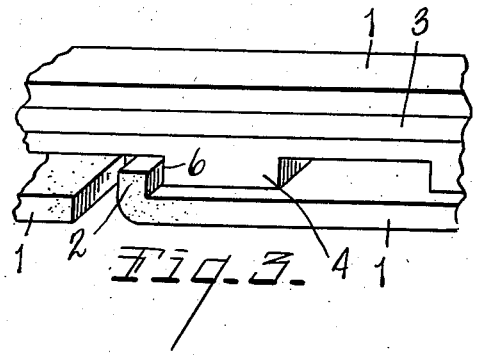
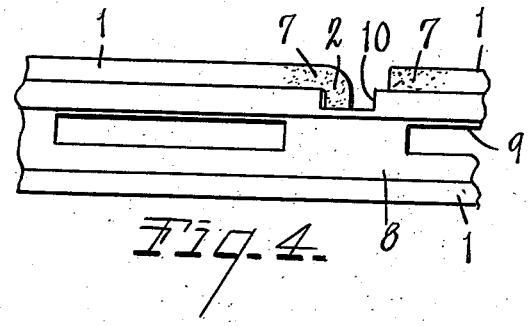
INVENTOR.
HAROLD P. PHILLIPS
BY Earl T. Chappell
ATTORNEYS Patented Mar. 31, 1942

2,278,019

UNITED STATES PATENT OFFICE 2,278,019

PISTON RING ASSEMBLY

Harold P. Phillips, Hastings, Mich., assignor to Hastings Manufacturing Company, Hastings, Mich., a corporation of Michigan Application March 8, 1940, Serial No. 322,899

5 Claims. (Cl. 309—44)

This invention relates to improvements in piston ring assemblies.

The main objects of this invention are:

First, to provide a piston ring assembly comprising a plurality of elements in which the elements are effectively engaged when assembled to prevent relative rotation.

Second, to provide an assembly of this character in which the features imparting relative non-rotatability may be very economically produced.

Third, to provide a piston ring assembly embodying thin split expansible cylinder wall engaging members of ribbon steel which are so formed that the naturally high or extreme point pressure zone at each side of the gap is of less hardness than the remainder of the member so that they more quickly wear in at these zones, thus securing a quicker seating and a rounder and better seating ring.

Further objects relating to details and economies of the invention will appear from the description to follow. The invention is defined and pointed out in the claims.

Preferred embodiments of the invention are illustrated in the accompanying drawing, wherein:

Fig. 1 is a perspective exploded view of a piston ring assembly embodying the features of my invention.

Figs. 2 and 3 are enlarged perspective views of the parts in assembled relation.

Fig. 4 is an enlarged fragmentary view of a modified form or embodiment of my invention.

It is recognized that split piston ring elements or members formed by coiling ribbon steel and also cast iron split piston ring members have zones of high unit pressure adjacent the splits, this resulting from the fact that the ring must be of such dimensions that it is necessary to collapse the same when it is installed in a piston ring groove or the piston placed within a coacting cylinder. The cast iron elements, owing to this greater pressure, wear in within a practical or reasonable time with an excess of wear at these zones.

Piston ring elements formed of ribbon steel or other hard wear resisting material wear in quite slowly at these zones and while the wear is greater owing to greater pressure, it still takes considerable time for the ring to wear in to become substantially round.

One of the objects of my present invention is to facilitate this wearing-in. Another is to provide simple means for engaging the elements so that they are held against relative rotation.

I have illustrated my improvements in Figs. 1, 2 and 3 as embodied in a structure having the features of my patent issued February 28, 1939, No. 2,148,997.

The assembly or embodiment of my invention shown in the accompanying drawing comprises a pair of annular split thin expansible cylinder wall engaging side members 1, 1 preferably formed of ribbon steel, each terminating at one end in an inturned or laterally disposed lug 2. These members are disposed on opposite sides of the annular split intermediate spacer member 3 preferably formed of cast iron and having one flat side, preferably the upper side being flat, and a plurality of radial recesses 4 providing drain openings.

The side member disposed against the flat side of the intermediate member has its lug 2 engaged with one end 5 of the intermediate member. The inturned lug 2 of the other side member is engaged with the wall of one of the recesses as at 6, see Fig. 3. This arrangement brings the splits of the side members substantially diametrically opposite and the several members of the ring assembly are held against relative rotative movement.

The ends of the members I have end zones or portions as indicated at 7 annealed thereby facilitating the forming of the lugs thereon and further decreasing the hardness of these end zones which are the zones of high unit pressure which are particularly incident to piston ring members formed of ribbon steel by coiling edgewise. I have attempted to illustrate these annealed zones by light lines which however will be understood as being a purely conventional illustration.

The length of these annealed zones may vary according to any variation in the unit pressure but it is my best judgment that they should not be less than one-fourth inch and should not exceed one inch on rings of diameters such as are commonly used in automobiles and motor vehicle internal combustion engines.

This annealing of the ends also permits increasing of the tension of the entire unit either by means of an expander or inherent in the unit or member.

A further feature is that this annealing prevents scratching or scoring of the cylinder walls during the wearing-in period which might otherwise occur particularly where the elements have relatively high cylinder wall pressure or inherent in the members themselves or through expanders.

I have not illustrated my assembly in combination with an expander as the relation of the cooperating parts of the ring elements with the expander are illustrated in my said patent.

In the embodiment of my invention shown in Fig. 4, the intermediate spacer member 8 has intermediate drain openings 9 as distinguished from drain openings in the form of recesses 4 as shown in Figs. 1, 2 and 3. In this embodiment the spacer is provided with recesses 10 in the sides thereof with which the lugs 2 engage.

It will be understood that I have not, in the accompanying drawing, attempted to illustrate the parts in manufacturing proportions. They are considerably enlarged for convenience in illustration.

I have not attempted to illustrate or describe various embodiments or adaptations of my invention which I contemplate as it is believed that this disclosure will enable those skilled in the art to which my invention relates to embody or adapt the same as may be desired.

Having thus described my invention, what I claim as new and desire to secure by Letters Patent, is:

1. As an article of manufacture, an annular thin split expansible cylinder wall engaging piston ring member of hard wear resisting material having an area adjacent the end portion only thereof in an annealed condition whereby wearing-in of the member in use is facilitated.

2. As an article of manufacture, an annular thin split expansible cylinder wall engaging piston ring member of ribbon-steel, areas adjacent the ends only of said member being in an annealed condition at the zones of maximum pressure for facilitating the wearing-in of the member in use.

3. In a piston ring assembly, a thin split expansible cylinder wall engaging member of hard wear resisting material having an axially offset portion sharply offset therefrom, said member being in an annealed relatively soft condition in the area adjacent said portion only whereby to facilitate the sharp offsetting thereof and the wearing-in of the member adjacent said portion in use.

4. As an article of manufacture, an annular thin split member of hard wear resisting material having restricted zones thereof in an annealed relatively soft condition to facilitate wearing-in at those zones in use.

5. A split piston ring element of thin relatively hard metal annealed at its ends to render the same relatively soft and having means adjacent said ends for anchoring engagement with a further piston ring member, the annealed condition of said ends facilitating wearing in of the element at the zone of increased pressure adjacent the ends.

HAROLD P. PHILLIPS.